United States Patent [19]
Sun et al.

[11] Patent Number: 6,026,787
[45] Date of Patent: Feb. 22, 2000

[54] AIR-FUEL CONTROL FOR ALTERNATIVE ENGINE FUELS

[75] Inventors: Xiaobo Sun, Long Beach; Syed Hussein, Anaheim Hills, both of Calif.

[73] Assignee: Impco Technologies, Inc., Cerritos, Calif.

[21] Appl. No.: 09/090,540

[22] Filed: Jun. 4, 1998

[51] Int. Cl.[7] .................................................. F02M 43/00
[52] U.S. Cl. ............................................ 123/525; 123/575
[58] Field of Search ............................ 123/27 GE, 525, 123/526, 527, 575, 698

[56] References Cited

U.S. PATENT DOCUMENTS

| | | | |
|---|---|---|---|
| 3,577,877 | 5/1971 | Warne . | |
| 3,650,255 | 3/1972 | McJones | 123/527 |
| 4,399,780 | 8/1983 | Lassanske et al. | 123/406.69 |
| 4,440,137 | 4/1984 | Lagano et al. . | |
| 4,476,827 | 10/1984 | Basaglia . | |
| 4,492,207 | 1/1985 | Hallberg | 123/527 |
| 4,614,168 | 9/1986 | Batchelor . | |
| 4,641,625 | 2/1987 | Smith . | |
| 4,936,280 | 6/1990 | Langlois | 123/578 |
| 5,224,457 | 7/1993 | Arsenault et al. | 123/526 |
| 5,337,722 | 8/1994 | Kwrihara et al. | 123/527 |
| 5,370,097 | 12/1994 | Davis | 123/526 |
| 5,526,797 | 6/1996 | Stokes | 123/575 |
| 5,546,908 | 8/1996 | Stokes | 123/480 |
| 5,549,083 | 8/1996 | Feuling | 123/179.5 |
| 5,713,336 | 2/1998 | King et al. | 123/525 |

*Primary Examiner*—Henry C. Yuen
*Assistant Examiner*—Hai Huynh
*Attorney, Agent, or Firm*—Edward A. Sokolski

[57] ABSTRACT

A mixture of gaseous fuel (natural gas or propane) and gasoline is used to fuel the internal combustion engine of a motor vehicle. The ratio of gaseous fuel to gasoline is preadjusted by the manual settings of an electronic processor which is used to change the gasoline fuel injection rate and the manual settings of an air/vacuum balance valve connected to a low pressure regulator and mixer are used to regulate the pressure of the gaseous fuel and mix it with air to provide the desired ratio. The fuel injection is also controlled in response to a signal fed to the processor which is in accordance with the output of the vehicle's exhaust oxygen sensors. The flow rate of gaseous fuel to the engine is controlled by means of a mixer which is preadjusted for a desired flow rate. This flow rate is automatically varied in response to the intake manifold pressure of the engine. This manifold pressure drives a valve which controls the gaseous fuel flow rate. When one of the dual fuels is depleted, a control in the electronic processor operates to switch to the other fuel and the vehicle is then operated on a single fuel.

4 Claims, 4 Drawing Sheets

AIR-FUEL CONTROL FOR ALTERNATIVE ENGINE FUELS

BACKGROUND OF THE INVENTION

1. Field of the Invention

This invention relates to engines using combined dual fuels and more particularly to a control system for mixing such fuels in a proper proportion.

2. Description of the Related Art

Gaseous fuel such as liquefied petroleum gas(LPG) and compressed natural gas (CNG) have long been recognized as fuels for motor vehicles. However, there are some disadvantages to each of these fuels. Natural gas and LPG while somewhat cheaper than gasoline and having lower emissions has a much lower energy density than gasoline and therefore requires much larger tanks to carry sufficient fuel. Further, there are a limited number of natural gas refueling stations. To combine the advantages of gaseous fuel with those of gasoline, fuel systems combining these fuels have been developed. Such a system is described in U.S. Pat. No. 4,641,625 issued Feb. 10, 1987 to Smith. In the system of this patent, the gaseous fuel flow rate is controlled by a microprocessor which controls such rate in response to engine speed and throttle position. Further, in Smith, the fuel pump is controlled to control the liquid fuel flow rate. The use of a microprocessor in Smith for controlling the gaseous fuel flow rate is a somewhat more complicated design than the simple mechanical control of the present invention. Further, the feeding of liquid fuel to the engine can be more effectively controlled by controlling the injection rate and duration by a simple processor, as in the present invention.

SUMMARY OF THE INVENTION

The device of the present invention provides an improvement over prior art devices in that it has a simplified adjustment mechanism for each fuel which can be preset to provide a ratio of gaseous to liquid fuel under normal operating conditions. This ratio is automatically adjusted in the case of the gaseous fuel in response to the intake manifold pressure of the engine and in the case of liquid fuel in response to the engine speed, intake manifold pressure and the engine's exhaust oxygen. The liquid fuel is typically gasoline while the gaseous fuel is typically liquid petroleum gas(mainly composed of propane) and compressed natural gas.

This operation is achieved by providing a special mechanically operated mixer for controlling the gaseous fuel valve which is slidably supported on a body portion of the mixer and spring urged. A diaphragm is formed on the upper end of the air valve with a diaphragm chamber being formed above the diaphragm. The air valve vacuum generated by the mixer is fed to the diaphragm chamber. When the engine is under a low load(i.e. the throttle plate is almost closed), the diaphragm assembly and along with it the gas valve move upwardly towards its closed position in response to the spring actuation causing the gas fuel rate to increase. With an increased engine load with the throttle plate opened wider, the diaphragm is driven in the opposite direction against the biasing action of the spring, thereby increasing the gaseous fuel flow rate.

The flow rate of the liquid fuel is controlled by means of an electronic processor inserted between the vehicle's regular fuel injection control module and the fuel injectors. This processor is adjusted to change the pulse rate and/or pulse width of the fuel injection control pulses to lower the gasoline injection rate as necessary to accommodate the fuel supply fed from the gaseous fuel supply. The electronic processor also receives a feedback signal from the exhaust oxygen sensors to further adjust the injection rate.

It is therefore an object of this invention to provide an improved dual fuel system for feeding a combination of both gaseous and liquid fuel to an engine.

It is a further object of this invention to provide a simpler more economical system for controlling the feeding of gaseous fuel to an engine operating on a combination of gaseous and liquid fuel.

Other objects of the invention will become apparent from the following description taken in connection with the accompanying drawings.

DETAILED DESCRIPTION OF THE INVENTION

Figure 1:
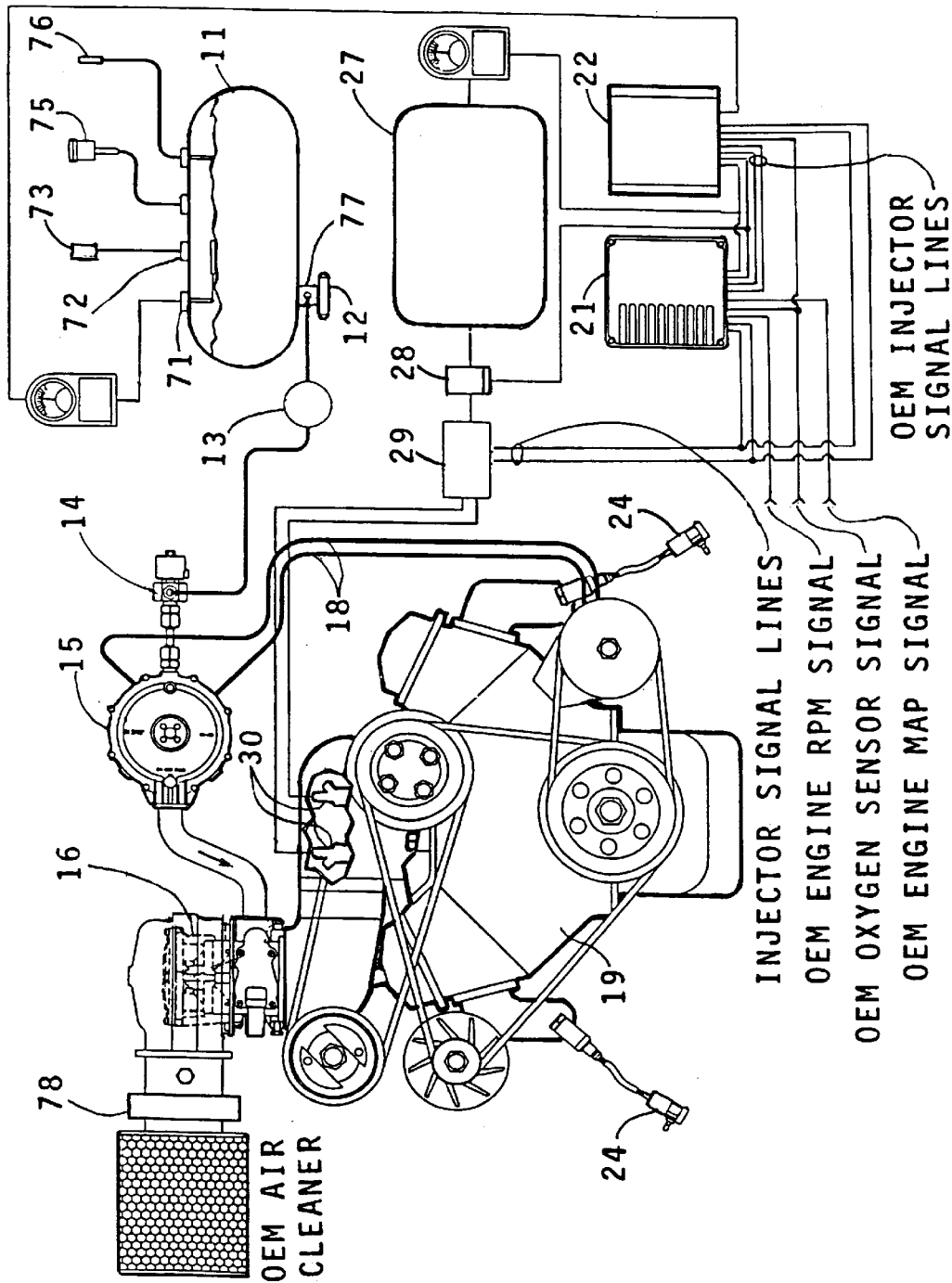
FIG. 1 is a schematic drawing illustrating a preferred embodiment of the invention.

Referring now to FIG. 1, a preferred embodiment of the invention is schematically illustrated. Propane fuel tank 11, as in conventional such tanks has a fuel sensor sender 71, a pressure relief valve 72, a remote discharge 73, an autostop valve 74, a remote fuel valve 75 and a remote fixed level gauge 76. Propane from fuel tank 11 is routed through hydrostatic relieve valve 12, fuel filter 13, and fuel shutoff solenoid controlled valve 14 to converter/regulator 15. Converter/regulator 15 evaporates and regulates it to a low positive pressure. The converter/regulator 15 has an adjustable air valve vacuum control in its balance port. The balance port is connected to the top diaphragm port of the secondary diaphragm of the converter. When the vacuum in the top diaphragm port increases, the gaseous fuel flow rate exiting from the converter decreases. By adjusting this vacuum manually, the gaseous fuel flow rate can be reduced as may be desired. To accomplish this end result, a three way solenoid valve may be used. One inlet of the solenoid is connected to receive the air valve vacuum. The other inlet is connected to the balance port on top of the converter/regulator. The outlet of the three way valve is connected to the balance port on the top of the converter. By adjusting the air inlet, the vacuum at the outlet of the three way solenoid valve can be adjusted to adjust the air/fuel ratio of the gaseous fuel.

Figure 4:
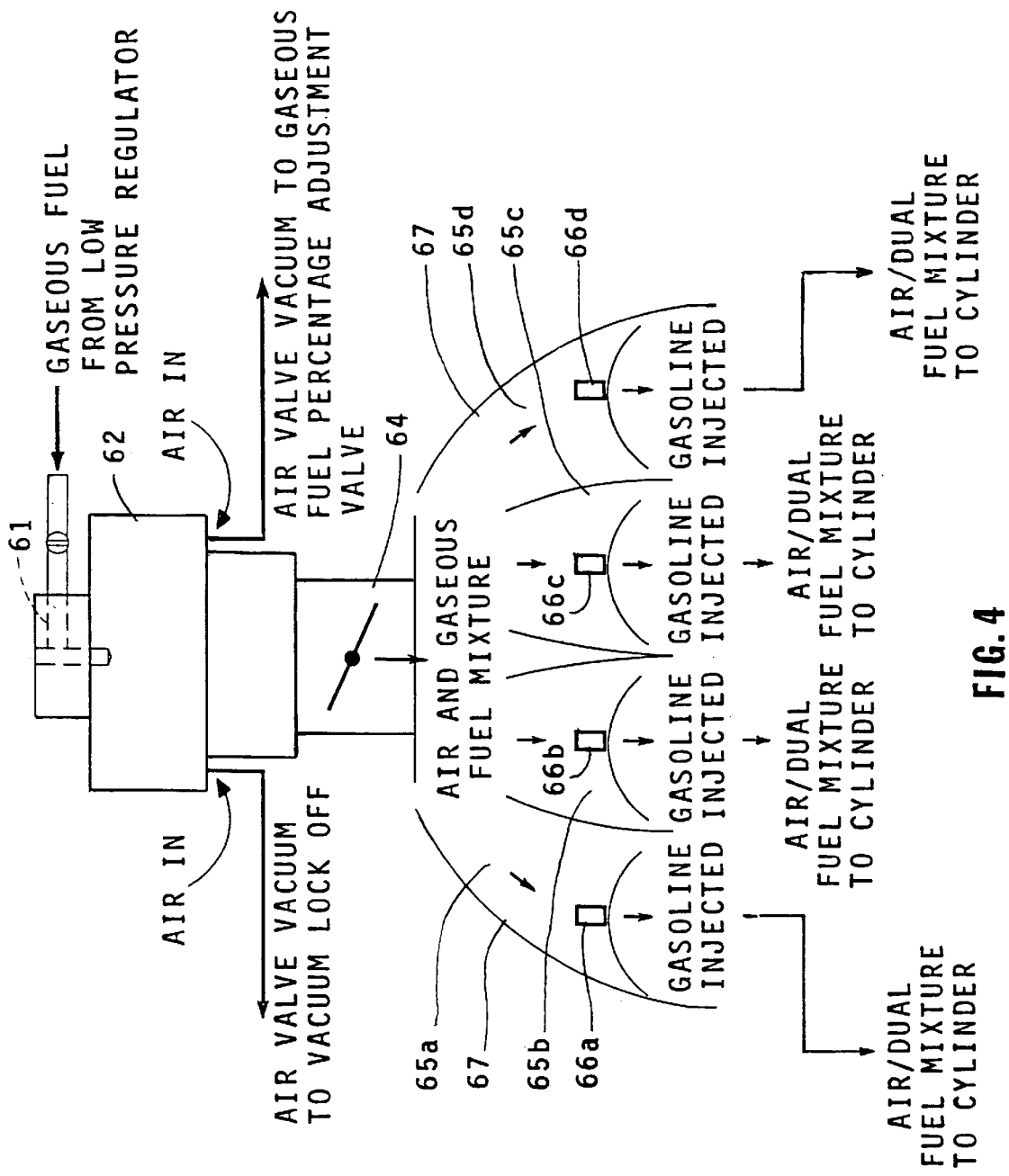
FIG. 4 is a schematic drawing illustrating the mixing of the gaseous and liquid fuel and its feeding to the engine cylinders.

To prevent the converter/regulator from freezing due to the endothermic evaporation utilized, engine coolant is circulated through a heat exchanger in the converter/regulator through lines 18 which run between engine 19 and the converter. The gaseous output of the converter/regulator is fed to mixer 16 which operates to regulate the flow of the gaseous fuel and mixes it with air, as to be explained further on in the specification in connection with FIG. 4. The gaseous fuel out of the mixer is fed to the engine throttle body where it is mixed with the injected liquid gasoline fuel and fed to the engine cylinders.

The liquid gasoline fuel system is a conventional fuel injection system except for the modification of the injection pulses generated in the vehicle's control module 21 which is provided by electronic processor 22, as explained in detail in connection with FIG. 2. As in a conventional system, gasoline is fed from fuel tank 27 through fuel pump relay control 28 to fuel rail 29 which operates to provide pulses of fuel in response to the pulse signals fed from electronic processor 22. The pulsating fuel output of fuel rail 29 is fed to fuel injectors 30.

Figure 2:
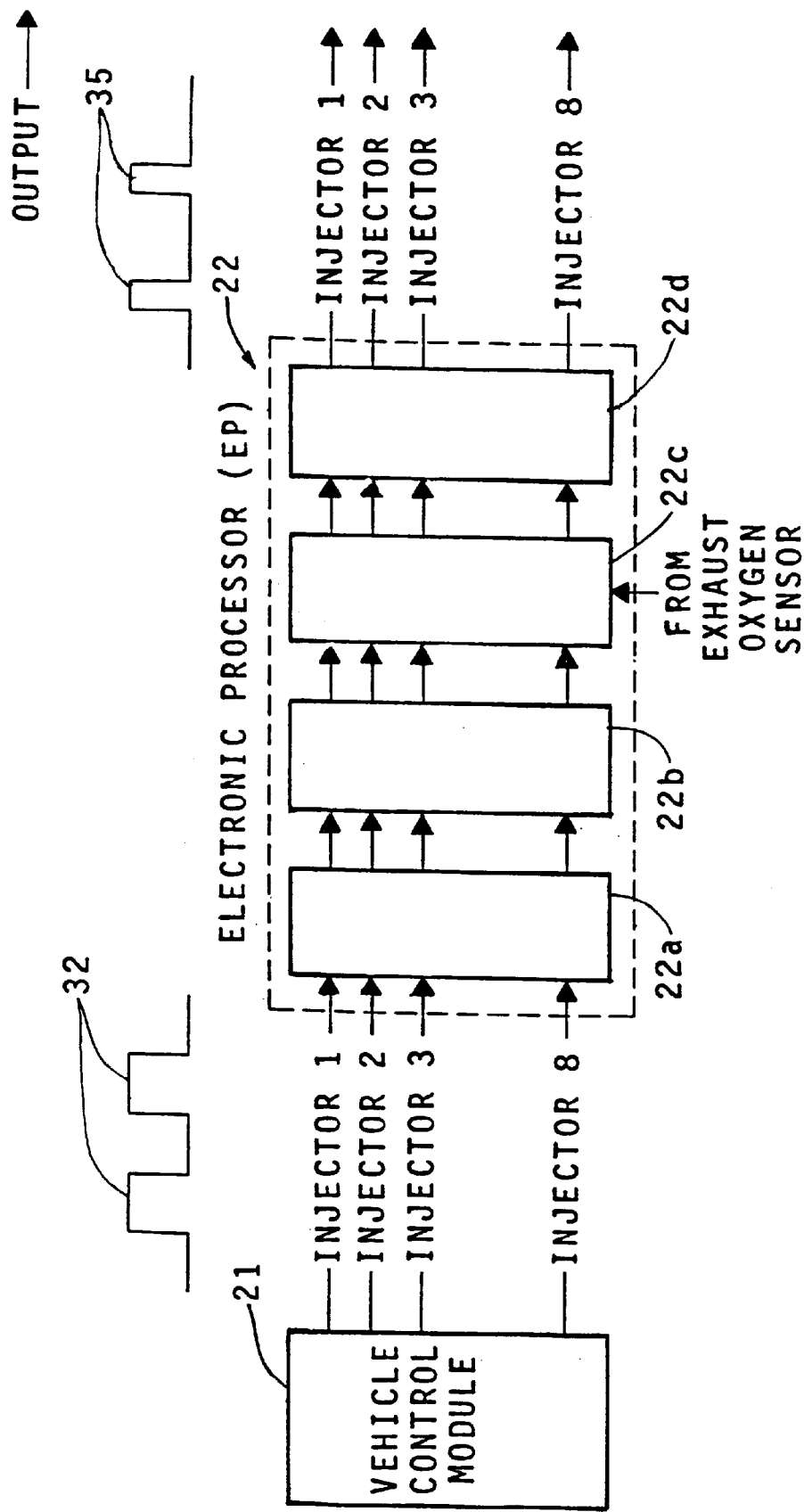
FIG. 2 is a functional block diagram illustrating the liquid fuel injection system of the preferred embodiment.

Referring now to FIG. 2, the electronic processor for controlling the liquid fuel flow is schematically illustrated. The output of the vehicle's regular control module 21 is a series of injector pulses 32 for each of the vehicle cylinders. These pulses are modified in width and timing by electronic processor 22 to produce injector pulses 35 for controlling the injection of liquid fuel into the engine. As can be seen, the time duration and frequency of pulses 35 is less than that of pulses 32 thereby utilizing less liquid fuel than the vehicle normally uses, this difference in fuel being made up by the gaseous fuel.

The processor has a first computing program 22a which measures the pulse width and the timing of the pulses 32. Second computing program 22b changes the pulse width and frequency as programmed to provide the desired output. Third program 22c modifies the pulse width and frequency in response to the feedback from the oxygen sensor 24 of the vehicle(see FIG. 1). Finally, modified injection pulses 35 are fed out of the processor though injector driver 22d.

Figure 3:
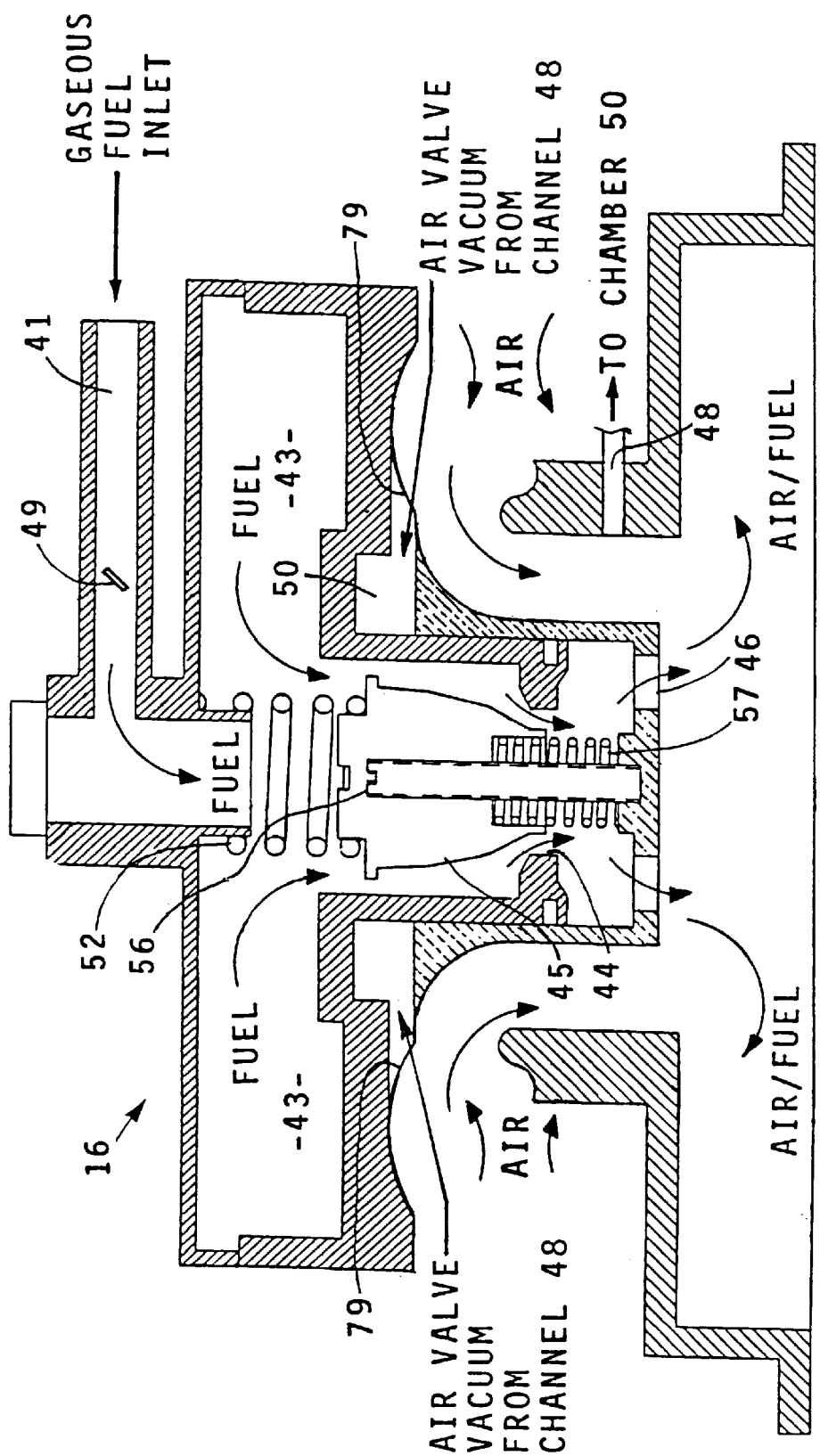
FIG. 3 is a cross sectional drawing illustrating the fuel mixer for the gaseous fuel of the preferred embodiment.

Referring now to FIG. 3, the mixer for controlling the mixing of the gaseous fuel with air is schematically illustrated.

Gaseous fuel is fed into a channel 41 in the mixer, and through a manual high speed mixture adjustment valve 49 into chamber 43. Valve 49 is a simple butterfly valve providing restriction to the fuel flow. The fuel then flows through the space between gas valve 45 and valve seat 44 and out of the mixer through outlet 46. Gas adjustment screw 56 is used to adjust the air/fuel ratio with the engine idling while adjustment valve 49 is used to adjust this ratio under high speed and high load conditions. Adjustment screw 56 is threadably attached to gas valve 45 and can be manually adjusted against the spring tension of spring 57 to change the spacing between valve seat 44 and the opposing surface of gas valve 45. The air/fuel ratio is also automatically adjusted in response to the air valve vacuum generated in channel 48. This air valve vacuum signal is fed from channel 48 to chamber 50 where it acts to position air valve diaphragm 79 relative to the upper portion of the mixer against the spring tension of springs 52 and 57. As the diaphragm is slidably mounted in the mixer, relative motion between the two in response to the air valve vacuum signal will change the spacing between gas valve 45 and valve seat 44 thereby changing the air/fuel ratio in response to the air valve vacuum signal. mixing the gaseous fuel Referring now to FIG. 4, the formation of the gaseous fuel, liquid fuel and air mixture is schematically illustrated. The gaseous fuel is fed from converter/regulator 15 (FIG. 1) through inlet 61 into mixer 62 where it is mixed with air. The air/gaseous fuel mixture is fed from the mixer to throttle body 64 which controls the feeding of this air/gaseous fuel mixture to each runner 65a–65d of intake manifold 67 where it is mixed with the liquid fuel (gasoline) injected by the gasoline injectors 66a–66d. The mixtures of gaseous and liquid fuel are then fed to each of the cylinders.

While the invention has been described and illustrated in detail it is to be understand that this is intended by way of illustration and example only, the scope of the invention being limited by the terms of the following claims.

We claim:

1. In an internal combustion gasoline engine having a throttle body, a supply of gasoline, and an injection system for injecting said gasoline into the throttle body, a system for constantly adding gaseous fuel to provide a mixture with the injected gasoline comprising:

electronic processor means for lowering the rate of injection of said gasoline into the throttle body thereby accomodating the supply of gaseous fuel, a source of gaseous fuel, and mechanical mixer means mounted on the engine above the engine throttle for controlling the air/fuel ratio of said gaseous fuel in response to the engine intake manifold pressure, the gaseous fuel output of said mixer being fed to said throttle body where it is mixed with the injected gasoline, the engine continually operating on the mixture of the gasoline and gaseous fuels, and operating on one of said fuels only when the supply of the other of said fuels is exhausted.

2. The system of claim 1 wherein a signal in accordance with the output of the engine's exhaust oxygen sensors is fed to said electronic processor means, said exhaust oxygen signal controlling said processor means to lower the rate of injection of said gasoline to accommodate the supply of gaseous fuel.

3. The system of claim 1 wherein said mixer means includes slidable valve means for controlling the gaseous fuel flow rate, said valve means being driven in response to the intake manifold pressure of the engine.

4. The system of claim 1 wherein said gaseous fuel is selected from the group consisting of propane and natural gas.

\* \* \* \* \*